Figure 1:
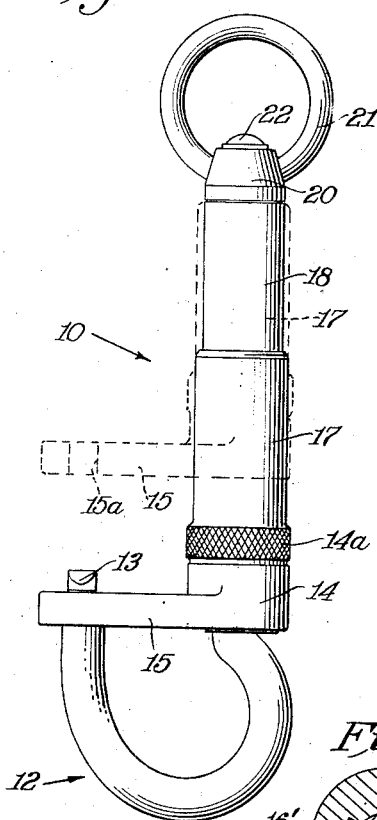

Oct. 7, 1941.   J. C. BAIRD   2,258,200
SNAP HOOK
Filed April 19, 1940

John C. Baird
INVENTOR

BY Victor J. Evans & Co.
ATTORNEYS

WITNESS

Patented Oct. 7, 1941

2,258,200

UNITED STATES PATENT OFFICE 2,258,200

SNAP HOOK

John C. Baird, Sugar Loaf, N. Y.

Application April 19, 1940, Serial No. 330,597

4 Claims. (Cl. 24—242)

This invention relates to improvements in hooks, shackles and the like and is especially concerned with a novel snap hook of the type comprising a hook element and overlying keeper useful in preventing disengagement of the hook from an object to which it is attached.

It is one of the objects of the present invention to provide a novel snap hook which can be readily and conveniently disengaged from an object to which it is attached but which includes means for preventing accidental or unauthorized disengagement, unauthorized disengagement having reference to intentional acts by irrational animals.

Another object of this invention is to provide a novel snap hook including a keeper which, spanning the hook, serves both to prevent disengagement of objects connected thereto and also serves materially to increase the strength of the hook in the sense that it prevents or at least largely inhibits straightening out of the hook element.

A still further object of this invention is to provide in combination with a hook element a spring urged keeper engaging with a latch formed on the distal end of the hook whereby accidental movement of the keeper formed latched position is precluded.

An advantage of the novel snap hook according to this invention over other types of snap hooks now commonly in use is that the spring urging means acting upon the keeper serve both to move the keeper into position spanning the arms of the hook element and also serve to cause latching of the keeper with the hook end.

Another advantage of the snap hook according to this invention is that the spring pressing means acting upon the keeper is concealed and protected within telescoping sleeves in a manner such that damage of the spring pressing means or clogging by dirt or foreign matter is substantially precluded.

Noteworthy among the features of the novel snap hook according to the present invention are its simplicity and ruggedness of construction, the former suiting the device to the requirements of manufacture under conditions of mass production and the latter assuring long useful life.

Other objects, advantages and features of the new and improved snap hook according to the present invention will be apparent to those skilled in this art during the course of the following description.

Regarded in certain of its broader aspects the novel snap hook according to the present invention comprises a shank having hook elements formed on one end thereof, a catch formed on an end portion of said hook element; a keeper adapted to span said hook element mounted on said shank in a manner permitting free sliding motion by restricting rotation, said keeper being engageable with said latch when rotated; and means tending to impart both sliding and rotative motion to said keeper.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Figure 2:
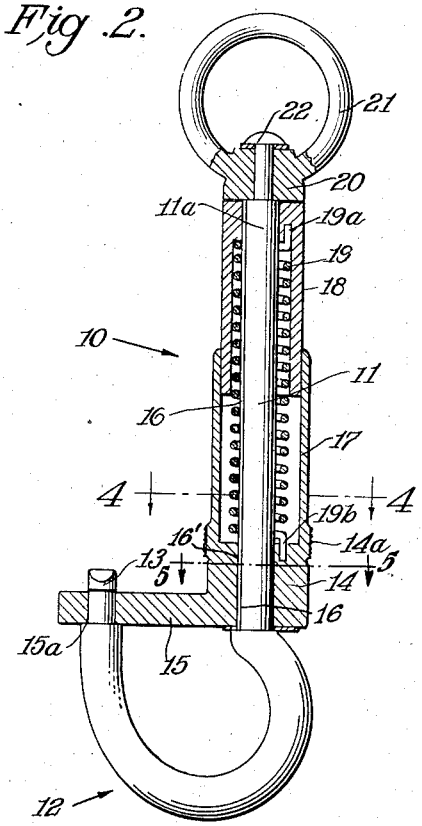
Figure 5:
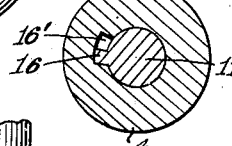
Figure 3:
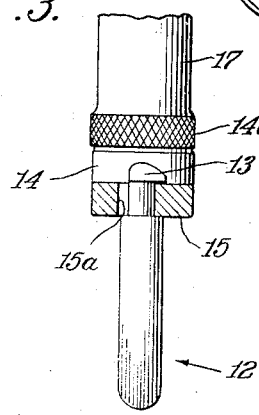
Figure 4:
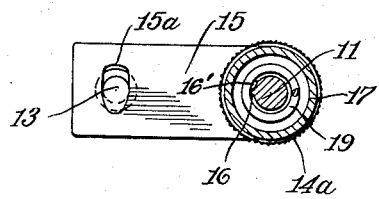

Referring then to the drawing,

Figure 1 is substantially a side elevational view of the presently preferred embodiment of this invention showing the keeper, in phantom view, in raised disengaged position, Fig. 2 is an essentially vertical sectional view of the device illustrated in Fig. 1 showing the details of internal structure thereof, Fig. 3 is a detail side view of a bottom portion of the snap hook, parts in section showing details of the latch structure, Fig. 4 is a horizontal sectional view of Fig. 2 taken along the line 4—4 thereof, and Fig. 5 is a horizontal sectional view taken on line 5—5 of Fig. 2 and looking in the direction of the arrow.

In the illustrated preferred embodiment of this invention generally designated by the numeral 10, a shank 11 is bent at one end to provide a hook element generally designated by the reference character 12 which is formed at its reduced distal end to provide an integrally formed offset catch element 13. A collar 14 freely slidingly mounted upon the shank 11 is provided with a radially extending keeper 15 having a slot-like opening 15a formed near the distal end portion thereof to receive and engage with the off-set catch element 13 hereinabove described. Knurling 14a is provided upon the collar 14 to facilitate swinging thereof upon the shank 11 but free rotation of the collar upon the shank, except for slight swinging motion as mentioned, is prevented by a longitudinally extending spline 16 integrally formed upon the shank and cooperating with a segmental groove 16' formed within the collar 14.

An integrally formed sleeve 17 carried on the collar 14 extends coaxially along the shank 11 and cooperates with the sleeve 18 mounted upon the shank end 11a to provide an essentially continuous telescoping protective cover for the helical spring 19 sleeved upon the shank substantially as shown. The ends 19a and 19b of the spring 19 are bent in a direction parallel to the axis of the spring and are received within openings formed in the sleeve 18 and in the collar 14 whereby not only are the sleeves 17 and 18 urged apart, but the spring also tends to impart rotative motion to the sleeves. Inasmuch as the sleeve 18 is connected to the shank 11 carrying the hook element 12 and the sleeve 17 is carried upon the collar 14 on which is mounted the keeper 15, it will be apparent that the keeper is urged toward the hook element and that rotation of the keeper will cause engagement of the keeper end with the latch 13. It is of course to be understood that the direction of rotation is such as to cause engagement of the keeper end with the latch element.

A collar 20 carrying an integrally formed loop 21 is connected to the end 11a of the shank 11 by means of appropriate fastening means 22. It will be evident that the collar 20 is freely rotatable upon the fastening means 22 and so permits of so-called swivel action.

Having thus described the presently preferred embodiment of this invention, its mode of operation now will be described. When the snap hook is to be engaged with an object, the hook element 12 is grasped with one hand and the knurling 14a with the other whereby slight rotative motion can be imparted to the collar 14 causing disengagement of the latch element 13 from the opening 15a formed in the keeper 15. When so disengaged, the collar 14 is moved along the shank 11 toward the shank end 11a against the action of the spring 19. When the hook element 12 has been engaged with the object, the collar 14 is released whereby the spring 19 causes the keeper 15 to move toward the hook element with resultant engagement of the latch element 13 with the opening 15a formed in the keeper. As will be apparent from consideration of the drawing, engagement of the keeper end with the latch element prevents movement of the keeper away from the hook element 12.

It is to be understood that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. A snap hook comprising a shank bent at one end to present a hook element, an off-set catch element integrally formed on a reduced end portion of said hook element, a longitudinally extending spline on said shank; a keeper adapted to span said hook element, mounted on said shank and having a segmental groove receiving the spline in a manner permitting free sliding motion but, because of engagement with said spline, restricted rotation, said keeper having a longitudinal opening formed near the distal end thereof for receiving and, when said keeper is rotated, engaging with said catch element; and means on said shank tending to impart both sliding and rotative motion to said keeper.

2. A snap hook comprising a shank bent at one end to present a hook element, an off-set catch element integrally formed on a reduced end portion of said hook element, a longitudinally extending spline on said shank; a keeper adapted to span said hook element, mounted on said shank and having a segmental groove receiving the spline in a manner permitting free sliding motion but, because of engagement with said spline, restricted rotation, said keeper having a longitudinal opening formed near the distal end thereof for receiving and, when said keeper is rotated, engaging with said catch element; and spring pressing means connecting said shank and said keeper tending to impart simultaneously sliding and rotative motion to said keeper.

3. A snap hook comprising a shank bent at one end to present a hook element, an off-set catch element integrally formed on a reduced end portion of said hook element, a longitudinally extending spline on said shank; a keeper adapted to span said hook element, mounted upon said shank and having a segmental groove receiving the spline in a manner permitting free sliding motion but restricting rotation, said keeper having a longitudinal opening formed near the distal end thereof for receiving and when said keeper is rotated, engaging with said catch element; and means tending to impart both sliding and rotative motion to said keeper comprising a first sleeve mounted on said keeper extending coaxially along said shank, a second sleeve coaxially mounted on said shank extending within said first sleeve, and a helical spring within said sleeves connected at one of its ends to said first sleeve and at its opposite end to said second sleeve.

4. A snap hook, comprising a keeper provided with a transverse elongated opening at one end, a laterally extending cylindrical member carried by the opposite end of the keeper, a shank extending through the cylindrical member and turned upwardly to form a hook at its free end provided with an off-set catch element co-operating with the transverse elongated opening in the keeper, a sleeve surrounding the upper end of the shank and extending into the cylindrical member, an eye swivelled on the shank above the sleeve, a coiled expanding spring surrounding the shank and having one end connected to the sleeve and the opposite end connected to the cylindrical member, and a spline and groove connection between the member and the shank for limiting the rotary movement of the shank in the keeper, whereby the off-set catch element on the hook overlies the upper face of the keeper.

JOHN C. BAIRD.